July 1, 1947.  J. LOUMIET ET LAVIGNE  2,423,397

STEAM BOILER REGULATING SYSTEM

Filed Oct. 8, 1941  4 Sheets-Sheet 1

INVENTOR.
Jean Loumiet et Lavigne
BY
ATTORNEYS

July 1, 1947. J. LOUMIET ET LAVIGNE 2,423,397
STEAM BOILER REGULATING SYSTEM
Filed Oct. 8, 1941 4 Sheets-Sheet 4

INVENTOR.
Jean Loumiet et Lavigne
BY Moses & Nolte
ATTORNEYS

Patented July 1, 1947

2,423,397

UNITED STATES PATENT OFFICE 2,423,397

STEAM BOILER REGULATING SYSTEM

Jean Loumiet et Lavigne, Itabo, Cuba

Application October 8, 1941, Serial No. 414,052
In Cuba October 17, 1940

17 Claims. (Cl. 122—448)

This invention relates to improvements in the regulation of steam boiler systems and in particular is based on the steam boiler regulating systems disclosed in my U. S. Patents No. 2,338,773 and No. 2,377,254. The latter application correlates various features of the former application to obtain total automatic regulation of the steam boiler system, and specifically the regulation of the feed water as well as of the means of combustion, namely, fuel and air. While the invention is described in its application to steam generating systems having a water chamber, it may be applied to boiler systems having no water chamber, as by replacing a system in which the regulation is governed by variations in water level by one in which the regulation is governed by differences in the temperature of the superheated steam.

The first patent application discloses an arrangement for regulating the water feed to maintain a constant water level in the boiler. One feature is the utilization of a fluid column made up of several fluids arranged so that the plane of separation of two of the fluids moves vertically in accordance with changes in the boiler water level but with substantially increased amplitude. The lower, denser fluid is a good electrical conductor, while the other fluid is a poor conductor; and the water feed is regulated by making or breaking contact with an electrode appropriately located in the fluid passage as the fluids rise and fall.

A second feature of said application consists in making the feed of the means of combustion interdependent with the water feed, and providing a complementary regulation of the feed of the means of combustion to adjust it accurately to the needs of the boiler system. A third feature of said application eliminates oscillations in the automatic water feed regulation.

The second application discloses an arrangement combining features of the first application for complete regulation of boiler systems, adapted to satisfy the two conditions for efficient functioning of the boiler system, namely, maintenance of a constant water level and maintenance of constant steam pressure.

The present invention introduces a number of improvements in the disclosure of said prior applications. One feature is the utilization of a horizontal column of mercury located between vertical columns of a fluid that is a poor electrical conductor. By utilizing a capillary horizontal tube, which may have a diameter for instance of less than three millimeters, the mercury column fills the tube and is prevented from escaping. The location of the mercury column therefore will correspond to the position of the boiler water level; but in view of the very small diameter of the mercury column it amplifies greatly the variations in said water level. The mercury therefore can be employed as an indicator and for governing the feed regulating system.

The feed control by means of the horizontal mercury column may utilize the systems disclosed in said applications. A specific improvement however is the utilization of double electrodes arranged so that the control circuit is closed by bridging the gap between the electrodes, instead of maintaining a constant connection with the mercury column. This reduces the path of the current through the mercury or other conducting liquid, an important feature where liquids of lower conductivity, such as saline solutions, are used.

Another feature is the elimination of the electrodes by enclosing the conducting column, such as mercury, in a tube made of a material of lower conductivity, such as high resistance steel, and utilizing variations in a current through the tube caused by shifting of the mercury column to control the feed. Since various known electrical systems of regulation can be utilized with this arrangement, they will not be described. This arrangement permits the utilization of a jointless tube, an advantage with high pressure steam generators. This feature may utilize an electromagnet whose armature will be shifted proportionately to variations in the current and therefore in the boiler water level; and the armature movements may be directly transmitted to the valve regulating the feed.

An important feature of this invention is the elimination of oscillations in the adjustment of the water level in accordance with the first feature of the first patent application mentioned above. This oscillation is due to the fact that when the water level falls, for instance, the feed water valve is slowly opened until the water level ceases to fall, which indicates full correction of the feed deficiency. However, the opening motion of the valve continues while the water is rising until it reaches the normal level; and therefore the valve is necessarily opened in excess of the requirements for correction. Consequently, the water will rise above the normal level and the operation will be repeated in reverse, producing oscillation of the water level. The third feature of said first patent application eliminates such oscillations to a certain extent; but an important feature of this invention is to accomplish this purpose in a still more effective manner, substantially preventing such oscillations.

This is in general accomplished by providing an arrangement which will actuate the valve only when the electromagnet armature or other controlling element is moving away from normal position, arresting such actuation when it is moving toward normal position. This will serve to arrest the valve when the motion of the water level away from normal is arrested, though the valve will normally overrun this position slightly and thereby start the water level back toward normal position. The consequent return movement of the electromagnet armature or the like will disconnect the motor operating the valve. Consequently, whether the water level rises or falls from normal position, as is the case where there is a variation in steam consumption, the valve aperture proper for providing the feed corresponding to the new steam consumption is obtained in a single operation without material oscillation.

Several arrangements of this type can be employed. In the form disclosed an appendage connected to the armature contacts a movable member shifted by outward movement of the armature, the valve operating current passing through the contact; but when the motion of the armature is reversed and it returns toward the center of its path the contact between the armature and said member is broken, arresting the valve adjustment. The armature may return said member to normal position mechanically, but the contact necessary for this purpose is insulated. Separate elements may be employed which are operative during the rise and fall respectively of the water level from normal position.

This mechanical principle may be embodied in various constructions. Moreover, this system of control can be applied to any regulating system operated by variations in the intensity of an electric current. It may be employed in connection with the variable resistance construction utilizing a shifting column of conducting liquid in a high resistance tube as indicated above. It is likewise applicable to the multiple liquid column systems disclosed in said applications.

A metallic filament extending lengthwise through an end of the conducting column may be utilized; but an arrangement of this type is not especially sensitive. To increase its sensitivity, the metallic filament may be replaced by a carbon filament in a glass support.

One factor which must be considered in connection with the utilization of the features of this invention in order to maintain constant boiler pressure is the fact that a fall in steam pressure and temperature results in the transfer of heat from the boiler, masonry and other contiguous parts of the system into the steam; whereas an increase in the temperature of the steam requires an additional amount of heat to compensate for the heat transmitted to such masonry and boiler to bring up their temperature. These factors are not reflected in the manometer reading; but they must be taken into account.

This is in general accomplished by providing an arrangement for continuing the corrective movement of the valve controlling the feed of means of combustion for the appropriate period after it has reached the proper opening and the armature starts to move back toward normal position. This result is advantageously obtained by providing a small spring at the point of contact between the armature and the movable contact member, arranged to maintain contact between the armature and said member for a certain period after the armature has started to move away from said member, the contact continuing until the spring is relieved of its compression. The spring can of course be mounted either on the armature or its connections, or on the movable contact member.

Another feature is the provision of an arrangement for correcting the resulting deviation in the feed of means of combustion from the correct normal supply after sufficient excess heat has been generated to compensate for absorption thereof by the elements surrounding the steam chamber and passage. For this purpose an arrangement is provided by which the control motor, after having been arrested, is again started in the reverse direction and is operated during a period which is sufficient to eliminate the feed deviation from normal. One arrangement of this type is described; but this is intended to be by way of illustration and not limitation, since other arrangements may be utilized.

These features may be applied to the automatic feed either of the water or of the means of combustion; but when both feeds are regulated without interconnection, they interfere with each other, since a variation in one feed changes the conditions affecting the other feed. The second feature of my first application, as well as my second application above mentioned, diminish these difficulties; but it is necessary to take into consideration the fact that the efficiency of the boiler varies when the steam consumption varies; and therefore the required quantity of the means of combustion for turning a given quantity of water into steam will vary. For instance, if the system is in equilibrium, a sudden increase in steam consumption will produce an immediate fall in pressure as well as in water level, the pressure drop operating to increase all of the feeds while the water level drop tends to increase the water feed relative to the feed of the means of combustion. This produces a defect in regulation which will result in oscillations and delays in returning to equilibrium.

If under similar circumstances the water level is utilized to control both feeds, this difficulty will not arise. However, the adjustment of the two feeds is not necessarily simultaneous in practice. If regulation of the feed of the means of combustion is obtained before that of the water feed, the regulation will be thrown out of equilibrium, requiring an increase in the feed of the means of combustion, which may be obtained by providing the additional time increment above described. If on the contrary, the regulation of the water feed is obtained before that of the feed of the means of combustion, the resulting lack of equilibrium is compensated by the necessity for additional heat absorbed by the boiler and other steam contacting parts as normal pressure is regained. Consequently, the latter arrangement is preferable for rapid adjustment. In steam generating systems of the Benson type in which there is no boiler, the main regulation must obviously be effected by steam pressure variations.

Another feature of the invention is the provision of an auxiliary regulation which will accelerate the return of the steam pressure to normal, providing increased sensitivity and, if necessary, increased amplitude, so that the latter regulation may replace the main regulation to maintain the pressure constant while the latter regulation is reaching its ultimate status.

The auxiliary regulation, effected through temperature variations in the superheated steam and arranged to maintain such temperature constant, serves to increase the proportion of the water feed when of combustion in relation to the water feed when the main regulation increases both feeds. Such auxiliary regulation utilizes the current from an electric pyrometer or the like, heated by the superheated steam.

In the accompanying drawings.

Figure 1:
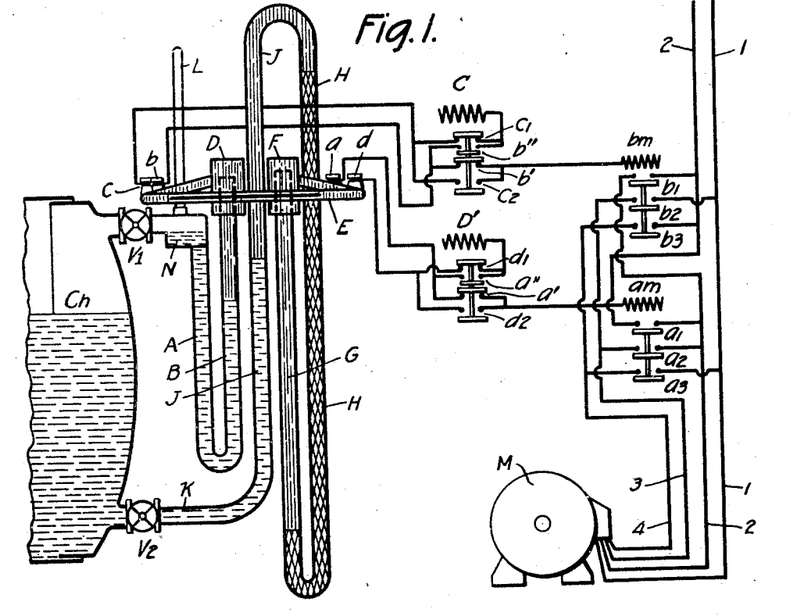
Fig. 1 is a vertical section of a system embodying the invention, operated by variations in the boiler water level to maintain said level constant.
Figure 2:
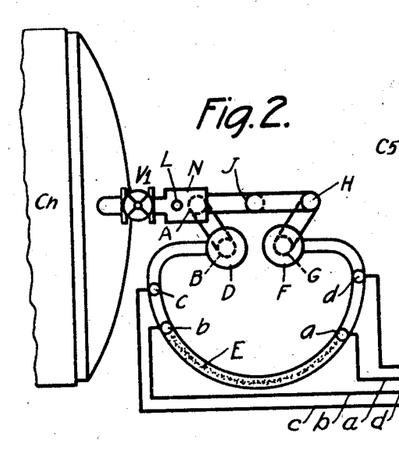
Fig. 2 is a plan view thereof.

Referring to Figs. 1 and 2, the embodiment illustrated therein is actuated by variations in boiler water level and is advantageously applicable to automatic regulation of the water feed.

In the vertical columns comprised in that apparatus, starting from its connection with the steam chamber of the boiler through the valve $V_1$, on to its connection with the water chamber of the same boiler through the valve $V_2$, the column A is made up of condensed water. The upper part of said column is constantly kept up through steam condensations in tube L, the excess of water being continuously emptied into the boiler; and an increase of section at N prevents a sudden motion of the fluid columns of the apparatus from causing an appreciable variation in the level of the aforesaid column. The column B is formed at its lower part by the condensed water column forming part of column A, and at its upper part by oil.

The horizontal column E is located in a tube of less than 3 millimeters in diameter filled ith mercury at its central part, and filled at its left hand part with oil from column B with which it connects through chamber D. In the same way, the right hand part of the horizontal column E is filled with oil from column G with which it connects through chamber F. Column G is formed by oil at the upper part, and at the lower part by a relatively dense liquid, for example, a water solution of salt. Column H is almost totally formed by the same dense liquid occupying the lower part of column G, excepting its upper part which is formed by oil. Finally, column J is formed at its upper part by the same oil as column H with which it connects, and at its lower part by water from the boiler with which it also connects through horizontal tube K and valve $V_2$ mentioned above.

In said variable level apparatus the difference of pressure between the steam chamber and the water chamber of the boiler is balanced by the differences in densities of the fluids of the several columns, so placed that the tendency to motion of the fluid in those columns from $V_1$ to $V_2$, which would exist if all the fluids were of the same density, is checked by the fact that the columns that tend to rise in such motion are made up in greater part of dense liquids; while the columns tending to descend are, on the contrary, made up in greater part of light fluids.

When the height of the water in the boiler changes, the equilibrium is destroyed. If, for example, we suppose that the level descends, the fluids of the column have a tendency to move from $V_1$ toward $V_2$; but then the quantity of the dense fluids increases in the columns that are raised by that motion, and the quantity of such dense fluids, on the contrary, diminishes in the columns tending to descend, because they are replaced by light fluids. Hence, a new equilibrium is rapidly established with a new position of the successive fluids of the columns.

Those variations in position are transmitted to the horizontal column of mercury which, by reason of such variations, is displaced in the horizontal tube E to one side or the other. The variations in position of the mercury column considerably amplify the variations in the positions of the fluids of the vertical columns, in accordance with the proportions between the section of the first one and that of the second ones of those columns. In consequence, the variable level apparatus can be made extremely sensitive, provided tube E be made long enough.

The regulation illustrated by Figure 1 applies the first arrangement disclosed in my first above mentioned patent application, with the difference of a simpler electrical arrangement. In this figure $a$ and $b$ represent the principal regulating electrodes, $c$ and $d$ the secondary electrodes that are employed to lessen the oscillations. In order to study the operations of the electrodes $a$ and $b$, we shall suppose for a moment that the electrodes $c$ and $d$ do not exist. Then, the coils C and D' would not exist either and the current from $a$ would be sent directly to the coil $a_m$ in the same way that the current from $b$ would be sent directly to the coil $b_m$.

When, by reason of a decrease in boiler pressure, motion of the fluids in the apparatus is produced and the mercury column is placed in contact with $a$, it is a sign that the water has a tendency to descend from its normal level and, in consequence, its feed is deficient. The coil $a_m$ then comes into action and closes switches $a_1$, $a_2$ and $a_3$. The current from line 2, which was broken, is reestablished through switch $a_1$, and provides a circuit for the electric current which, entering by line 1, runs through the circuits of the motor which is supposed to be of alternating current type. At the same time, the line 1 has been placed in contact with line 4 through the switch $a_3$, and the line 2 has been placed in contact with line 3 through the switch $a_2$.

The starting current enters then the motor through line 4, going out through line 3, which produces motion of that motor in the direction proper for slowly increasing the aperture of the valve governing the water feed. When, by reason of such increase in feed, the lowering of the water in the boiler is checked and its level rises again, the motion of the fluids in the vertical columns of the regulating apparatus take place in the inverse direction and the mercury column reverses its motion, moving from $a$ toward $b$.

When, by reason of that motion, the contact of that column with the electrode $a$ ceases, the coil $a_m$ is deenergized, the switches $a_1$, $a_2$ and $a_3$ open and the current that drives the motor is suspended. In consequence, the opening motion of the valve is interrupted and its aperture is fixed in the position held at that moment.

When, by reason of a water increase in the boiler, the mercury column in tube E reaches contact with electrode $b$ (which takes place when the boiler water level is slightly above the normal level) the current in coil $b_m$ is established and closes switches $b_1$, $b_2$ and $b_3$. The break in line 2 then ends because that line is closed through switch $b_1$; line 1 is placed in contact with line 3 through switch $b_2$, and line 2 is placed in contact with line 4 through switch $b_3$.

The motor then receives its normal current through lines 1 and 2 as before; but it receives the starting current entering by 3 and going out by 4, that is, in inverse direction to the previous case. In consequence, the motor renews its motion; but this time the motion takes place in inverse direction to the previous one, that is, it produces the slow and progressive closing of the aperture of the valve governing the water feed.

As has been described in the third arrangement disclosed in my first above mentioned patent application, the construction which accomplishes the suppression of oscillations consists in the employment, in the tube containing the indicating liquid, of one or several supplementary electrodes, outside of the electrodes $a$ and $b$, whose function is to interrupt the current when the level of the indicator liquid column, after having passed one of such electrodes in moving from the center of its oscillations toward its extremes, and returning toward the center, passes said electrode again.

The functioning of electrode $c$ is carried out by means of coil C which governs 4 switches, namely, switches $c_1$ and $b'$ that open when the current passes through the coil C, and switches $b''$ and $c_2$ that close when the current passes through coil C. When the left hand end of the mercury column does not reach the point $b$, no current whatever passes through the coil $b_m$. As long as the mercury does not reach electrode $c$, the switch $c_1$ remains closed; and since there is no current coming from $c$, that switch does not transmit any current to the coil C; while switch $b'$ is closed and transmits the current from $b$ to the coil $b_m$. This coil $b_m$ governs the motor M so as to keep it going in the proper direction to slowly and progressively reduce the aperture of the valve.

When the mercury column continuing its motion toward the left comes in contact with the electrode $c$, the coil C receives current through the switch $c_1$ and produces the opening of said switch $c_1$ and of switch $b'$, but at the same time it closes switches $b''$ and $c_2$. Switch $b''$ keeps up the current in coil C, and switch $c_2$ keeps up the current in coil $b_m$. When, after having passed its maximum, the level in the boiler descends again and the mercury column receding toward the right loses contact with electrode $c$, the current of that electrode, which was feeding coil $b_m$ through switch $c_2$ is broken, and in consequence the motion of the motor governed by said coil $b_m$ is also suspended. The valve is then fixed at the aperture position held by it at that moment.

This operation is based on the supposition that the coil C may be able to make a contact at $b''$ in spite of remaining without current during the very short lapse of time which may pass between the opening of switch $c_1$ and the closing of switch $b''$. If it were necessary, an arrangement might be employed to guarantee these operating conditions, having the object of delaying the opening of the switch $c_1$. To that end, between the plate which through its motion either opens or closes that switch and the seat of the same, small springs are interposed that are compressed when the switch closes and are expanded when it opens; the opening operation being delayed by reason of the extension of the time of contact provided by said expansion.

The electrode $d$ operates in precisely the same way, and so does not require a new description.

I have already pointed out that this system brings the position of the valve that is fixed in each oscillatory motion quite near to its exactly correct aperture position, reducing the oscillation in that way.

Figure 3:
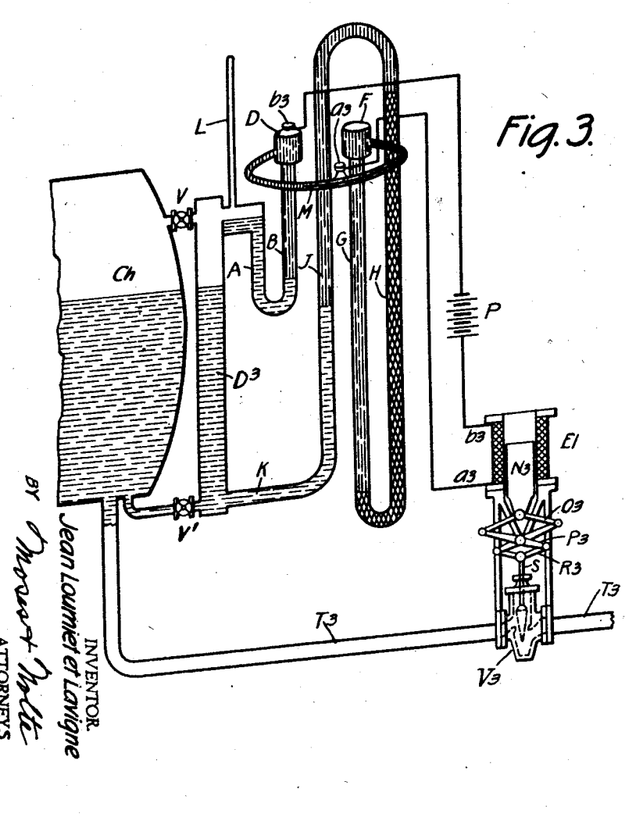
Fig. 3 is a vertical section through a modification, applied to the water feed line.

Figure 3 represents the same regulation as Figure 1, even if carried out in a different way. An electric current passes through the part $a^3b^3$ of the tube M. Said current goes also through an electromagnet $E^l$. The current is produced by an electric source P of constant voltage. The intensity or amperage of the current varies with the resistance of the circuit, and that resistance, in turn, varies as the mercury column penetrates into the tube M more or less from $a^3$ toward $b^3$.

Another arrangement is represented in the figure, namely, the interposition of tube $D^3$ between the variable level apparatus and the boiler. An arrangement of this type is recommended principally for high pressure boilers having small steam and water chambers; since, when by reason of an increase in steam consumption in these boilers the pressure falls suddenly and an instantaneous evaporation is produced, the water stored becomes emulsified by the steam produced and its level rises considerably. If the regulating level were directly attached to the boiler, the momentary disturbance created in the boiler would have an unfavorable effect upon the regulation. The small tank $D^3$ acts like a spring which avoids these difficulties, because the level variations in the boiler are not instantly transmitted to that tank. Such level variations in tank $D^3$ are produced by a stream of water that it receives or transmits to the boiler through valve $V'$; which required a substantial lapse of time.

The arrangement also prevents undesirable effects from the differences in pressure that would be momentarily produced at the point of the water chamber of the boiler where the variable level apparatus might be attached, caused by the fact that the steam bubbles that rise through the water and pass that point, or near to it, produce a suction within the water surrounding them.

Figure 4:
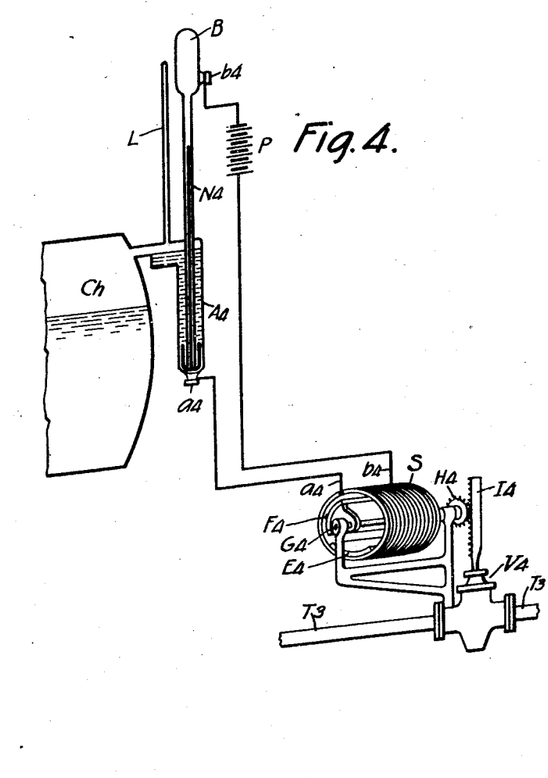
Fig. 4 is a similar view of another form operated by boiler pressure variations to maintain such pressure constant, applied to the fluid fuel feed.

Figure 4 represents the application of the same system to the regulation of liquid fuel through differences in boiler pressure to maintain such pressure constant. In said figure the pressure is indicated by a compressed air manometer $A^4$ with a mercury column, connected to the steam chamber of the boiler. The regulating electric circuit comprises tube $N_4$ of the mercury column of the manometer from $a^4$ to $b^4$ and an electromagnet S which has been shown as cylindrical in shape. The greater the pressure, the longer is the column of mercury in the tube $N^4$ and the smaller is the electrical resistance of the circuit. In consequence, the current produced by the source P runs through the circuit with greater intensity; the fixed magnet $E^4$ located adjacent oscillating armature $F^4$ on shaft $G^4$ magnetized in the same sense repel each other with greater strength; and such greater repulsion moves armature $F^4$, rotating shaft $G^4$ and the pinion $H^4$ carried thereby meshing with rack $I^4$ connected to the stem of valve $V^4$, causing the rack $I^4$ to descend, thus producing a greater closing of the valve $V^4$.

Figure 7:
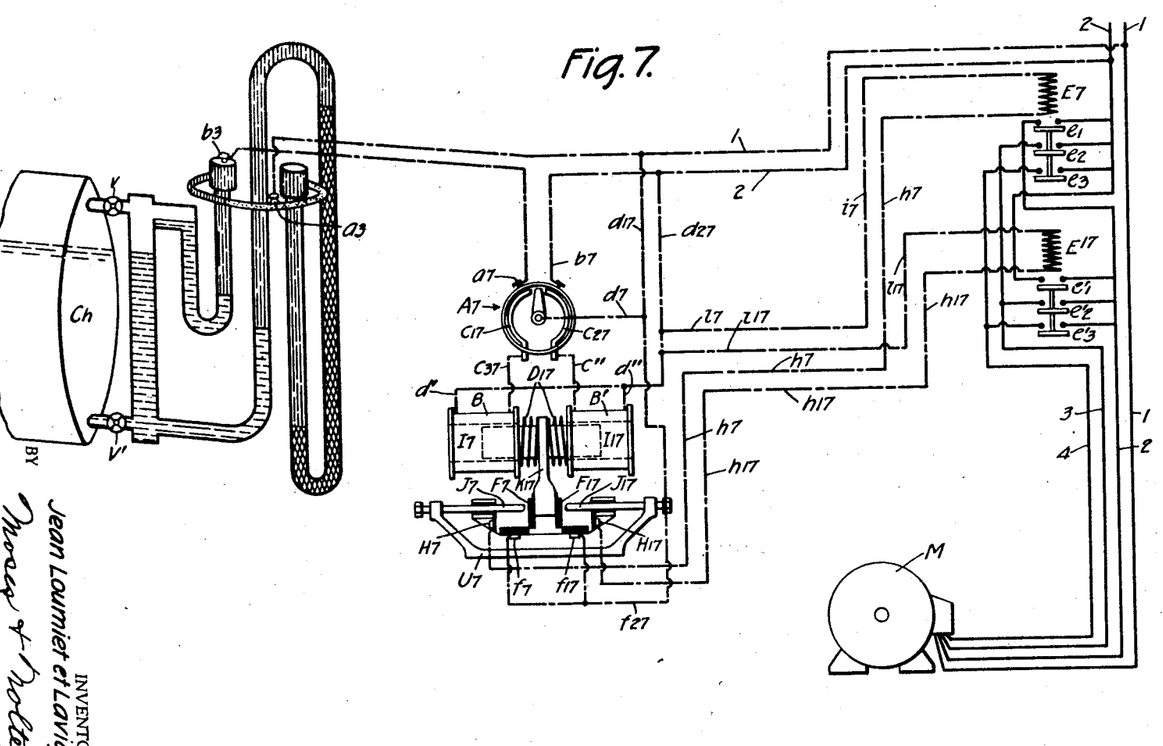
Fig. 7 is a similar view of another arrangement for suppressing oscillations in the automatic regulation of the water feed, operated by variations in the boiler water level.

Figure 7 represents an automatic regulation system which applies the arrangement that suppresses the oscillations. Said automatic regulation is intended to be accomplished through water level variations in the boiler $C_h$ to maintain the water level constant. The system utilizes the level of several fluids and has been previously described with its horizontal column of mercury whose motions, reflecting the motions of the water level, modified the conductivity of the tube containing it, as illustrated in Fig. 3. Such change of conductivity in the part $a^3b^3$ of that tube is applied to the regulation, which is accomplished as follows:

The electric current which runs through the circuit including the part $a^3b^3$ of the horizontal indicator tube, runs through an amperemeter which is so regulated that its needle stands at the center of the scale when the level in the boiler is normal, and deviates, for example to the left, when, the level having fallen, the mercury column occupies a smaller portion of the tube $a^3b^3$, the electrical resistance of the tube increases and the electric current in the circuit decreases. On the contrary, when the level in the boiler rises above normal, the mercury column, occupying a greater portion of the tube $a^3b^3$, decreases the resistance of that tube and increases the electric current in the circuit, the needle of the amperemeter shifting to the right of the center of the amperemeter scale.

A second current passes through $d_{17}$ and $d_7$ into the needle of the amperemeter. When that needle is at the center of the scale the current has not outlet; but when the needle deviates to the left and makes contact with the resistance $c_{17}$, that resistance conducts the current through $c_{37}$ to the coil B, from which it exits through lines $d'$, $d''$, $d_{27}$ and 2.

As the intensity of the current of the circuit through $a^3b^3$ decreases, the needle of the amperemeter shifts downward and the part of the resistance $c_{17}$ in the circuit of the coil $B_1$ diminishes. In consequence, the current in that coil increases. On the contrary, when the level rises in the boiler and by reason of that rise the column of mercury penetrates deeper into the tube $a^3b^3$, diminishing its resistance; once the level of the water in the boiler rises above normal, the amperemeter needle passes into the right hand part of the scale and comes in contact with resistance $c_{27}$ which transmits the current of the second circuit passing through the needle. The current of that second circuit exists through the lead $c''$ to the coil $B'_1$ and hence to the line 2 through the lines $d''$ and $d_{27}$.

The higher the level in the boiler the more the amperemeter needle shifts downward, the smaller is the part of the resistance of $c_{27}$ interposed in the circuit and the greater is the intensity of the current in the coil $B'_1$.

In this way coil $B_1$ operates when the boiler level is lower than normal, and with increasing intensity as that level goes on falling; and coil $B'_1$ when the boiler level is higher than normal, and with an intensity that goes on increasing as that level rises.

Both coils act upon two united soft iron cores $I^7$ and $I^{17}$, the motions of which are regulated by two springs $D^{17}$ so that to an intensity of the current, or to a given height of the boiler water level, there corresponds a given position of both cores. These two cores carry along in their motion an appendage $K^{17}$ situated between them. We shall proceed to study the operation of that appendage.

We shall suppose, for example, that, the water having fallen in the boiler, the resistance of the tube $a^3b^3$ has increased and the amperemeter needle has declined to the left, having established the current in the coil $B_{17}$. Then, the iron core $I^7$ is attracted by coil $B_{17}$ and the appendage $K^{17}$ moves to the left. The appendage $K^{17}$ is totally or partially a bad conductor of electricity; but on its right and left faces it carries two plates $F^{17}$ and $F^7$ of good conducting metal.

As soon as the appendage, following the motion of the cores, moves toward the left, the plate $F^7$ comes into contact with the plate $f^7$ and receives through that second plate the current of line 1 through $d_{17}$. The motion of the appendage places plate $F^7$ rapidly in contact with the small rod $J^7$ and in consequence starts the transmission to that small rod of the electric current received by $F^7$ from the line 1. The small rod $J^7$ passes through the piece $H^7$ with some friction and, in turn, transmits the electric current of line 1 to piece $H^7$. The current then exits from $H^7$ by line $h^7$ to coil $E^7$ and from that to the main line 2 through the lines $i^7$, $l^7$ and $d_{27}$. In that way the current is established in coil $E^7$.

Coming into operation, the coil $E^7$ closes switches $e_1$, $e_2$ and $e_3$ and in that way causes the passing of the normal current through motor M, so as to cause that motor to rotate toward the right. Said motor actuates either the admission valve of the steam engine which drives the feed pump, or upon the rheostat of the electric motor which drives the feed pump, so as to slowly and progressively increase the water feed as long as the piece $F^7$ keeps contact with the small rod $J^7$. On the other hand, as the attraction of the core $I^7$ by the coil B increases, it draws the appendage $K^{17}$ toward the left, and appendage $K^{17}$ draws in its motion the small rod $J^7$ which continues to slide into the interior of the piece $H^7$. In the longitudinal motion the small rod $J^7$ draws frame $U^7$ and the small rod $J^{17}$ which slides on the piece $H^{17}$ in the same way as the rod $J^7$ slides on the piece $H^7$.

As long as the motion of frame $U^7$ continues toward the left the current passes through the coil $E^7$ and the motor M acts to increase the aperture of the valve which, directly or indirectly, regulates the water feed. When such valve regulating the water feed shall have reached its proper point and established a feed adapted perfectly to the steam consumption of the boiler, the descending motion of the boiler water ceases and, in consequence, the intensity of the current in B also ceases to increase. The appendage $K^{17}$ maintains a fixed position and ceases to draw the frame $U^7$, but it continues in contact with the small rod $J^7$, and the current of the circuit of coil $E^7$ is maintained.

But, since the motor continues increasing the aperture of the valve regulating the water feed, that feed rapidly assumes a slight excess in relation to the needs of the consumption and the water level in the boiler begins to rise. As soon as that rise occurs, the mercury column inside the tube $a^3b^3$ goes on increasing slightly and the current of the circuit through $a^3b^3$ along with it; the needle of the amperemeter $A^7$ ascends slightly, increasing the resistance $C_{17}$ of the circuit of the solenoid B and diminishing the intensity of the current in that circuit; the coil B has less force of attraction and the iron cores are impelled toward the right by the action of the springs $D_{17}$. The appendage follows that motion of the iron cores toward the right and loses contact with the small rod $J^7$. As soon as that contact ceases, the current through the coil $E^7$ is suspended; and in consequence, the motion of the motor M is also suspended. The aperture of the valve remains invariable from that moment on in a position very near to its proper one.

If the level descends again thereafter, the appendage $K^{17}$ returns again toward the left, the piece $F^7$ again renews its contact with the small rod $J^7$ and the current through the coil $E^7$ is reestablished, that is, the motor begins again to increase the aperture of the valve. On the contrary, if owing to a slight excess in the valve aperture or to a decrease in the steam consumption, the boiler water level rises, the current passing through $B_1$ goes on disminishing in intensity, the appendage $K^{17}$ moves toward the right and the plate $F^{17}$ comes into contact with the small rod $J^{17}$, pushing the whole frame by means of that small rod, including the small rod $J^7$ toward the right. But since the plate $F^{17}$ does not receive at that moment any current, neither can it transmit it to $J^{17}$.

It is only when, the water level having passed above the normal level, the coil B' comes into operation and slightly deviates the appendage $K^7$ toward the right in relation to its normal position, that the piece $F^{17}$ comes into contact with the piece $F^{17}$, receiving from the latter the current of line 1 through the lines $d_{17}$ and $f^{27}$ and transmitting the current to the coil $E^{17}$ through the small rod, the piece $H^{17}$ and the line $h^{17}$. Since that coil is connected at its other end with line 2 through the lines $l^{17}$ and $d_{27}$, the current passes through that coil and the switches $e'_1$, $e'_2$ and $e'_3$ are closed. These switches connect the normal and starting current to the motor in such a way that the motor operates in inverse direction to its previous motion, moving toward the left; that is, slowly and progressively diminishing the aperture of the regulating valve which governs the water feed.

From that moment on, the appendage $K^7$ operates with the rod $J^{17}$ in the same way as I have described in relation to its operation with the rod $J^7$.

The arrangement thus fulfills the conditions that I have previously stated, namely, that as long as the water level descends the regulation operates by enlarging the aperture of the valve governing the feed; and when the level ceases to descend and starts rising, the aperture of the governing valve also ceases to be modified, leaving it set at an amount representing very nearly its proper aperture, in accordance with the steam consumption. When, on the contrary, the water level rises in excess, the regulation operates to diminish the aperture of the valve governing the water feed; and finally, when that water level begins to descend said regulation ceases to act upon the aperture of the governing valve, thus leaving that aperture in a position substantially representing its proper aperture in accordance with the steam consumption of the boiler at that moment.

The cessation of regulation is not effected immediately at the instant the characteristic being regulated reaches the maximum value, but at the instant this characteristic begins to move in a reverse direction. There is an indispensible time lag between the period when the characteristic to be regulated reaches a maximum value and the period when the regulation ceases. This time lag results from the inevitable delay inherent in mechanical and electrical operations. Therefore, even though the train of operations necessary to effect cessation of regulation is initiated immediately after the characteristic to be regulated reaches a maximum value, the actual cessation of the regulation takes place after a short interval. Even assuming that when the characteristic reaches a maximum value the valve is at a proper opening for net zero flow, the regulation necessary to initiate the return of the characteristic towards normal value requires an overregulation of the valve. The slight overregulation of the valve causes the characteristic to return to its normal value progressively and very slowly.

Figures 5, 6:
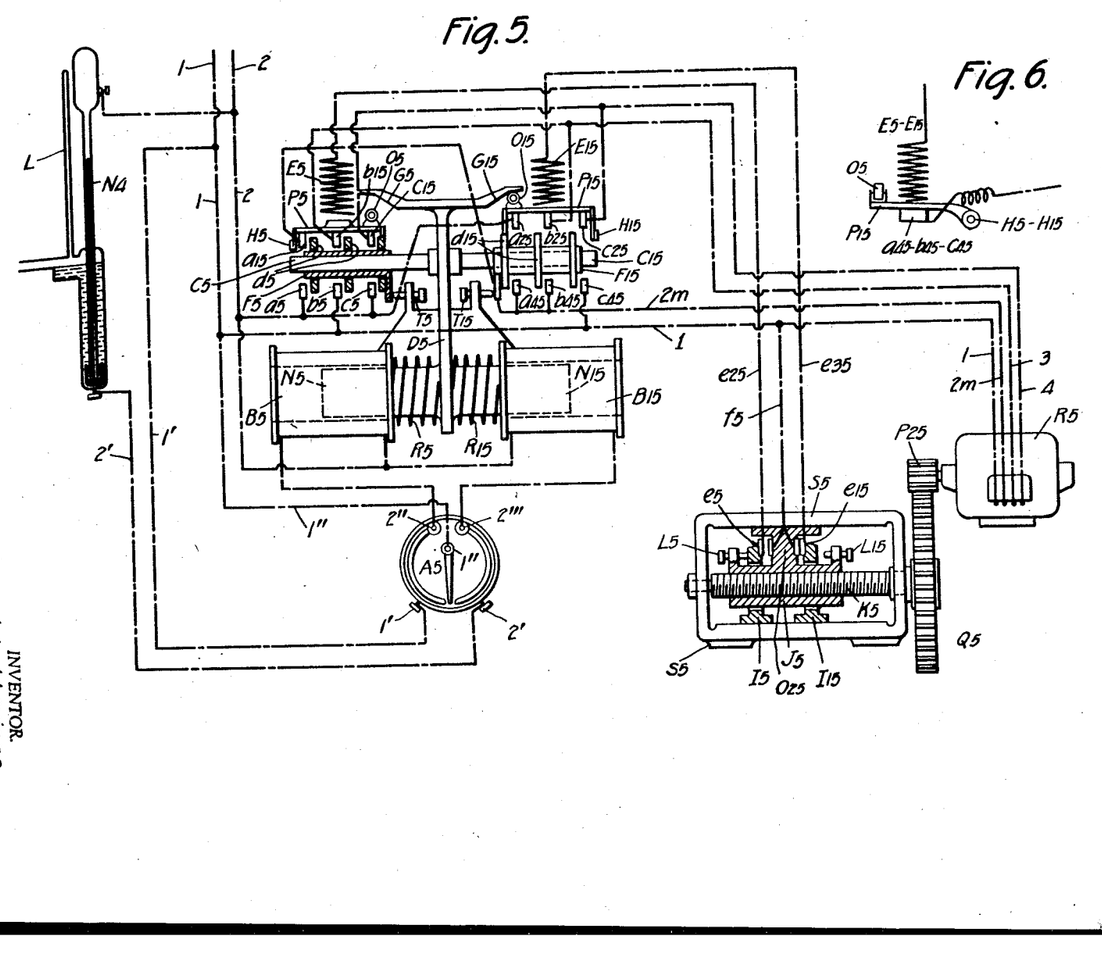
Fig. 5 is a similar view of a system operated by boiler pressure variations for preventing oscillations in the feed regulation.
Fig. 6 is a detail of Fig. 5.

Figure 5 represents the employment of the same system applied to regulation through pressure variations instead of through variations in the water level; but the application described graphically in that figure assumes that the level variations of the manometer reveal the variations in the feed of the means of the combustion with a slight delay, the amount of such feed being established at a volume slightly in excess of the proper quantity when the minimum of the boiler pressure is indicated; so that in order to restore such feed to its proper level it is necessary to operate the motor in reverse direction during the short period of time it may require to correct said excess of the feed of the means of combustion. It operates in the same way, but in reverse direction, when the manometer indicates a maximum of pressure.

The first electric circuit of the regulating system illustrated by Figure 5 comprises the manometric tube $N^4$ and the amperemeter $A^5$. Said amperemeter is so regulated that its needle is situated at the center of the scale when the boiler pressure is normal. When that pressure decreases below normal the mercury drops in the manometric tube $N^4$, the resistance of that tube increases, the intensity of the current passing through the circuit decreases and the amperemeter needle moves toward the left, rising the more the greater the drop in pressure.

Said needle receives in turn, as in the preceding arrangement, a current from the main line 1 and as soon as it starts its motion toward the left it comes into contact with a resistance through which it transmits that current to the coil $B^5$. The current exits from that coil at its other end toward main line 2 with which such end is permanently connected.

The lower the steam pressure is, the lower is the intensity of the current in the circuit which comprises the manometric tube $N^4$, the greater is the needle deviation upwards, the less is the resistance interposed in the circuit of the coil $B^5$ and the greater the current in that coil. Said coil acts upon the iron core $N^5$ and in consequence its attracting action is the greater the lower the boiler pressure falls.

When, on the contrary, the boiler pressure rises in excess, the mercury in the manometer tube $N^4$ also rises in excess. The electric resistance of the tube decreases below normal, the current in the electric circuit comprising that tube increases and the needle of the amperemeter $A^5$ moves from its central position toward the right, coming into contact with a resistance through which a circuit is established from the line 1 to the line 2 comprising the needle, the resistance to the right of the amperemeter and the coil $B^5$.

The current then passes through the coil $B^5$ with greater intensity the higher the boiler pressure rises, because as the pressure increases the amperemeter needle rises and in consequence the amount of resistance interposed in the circuit of the coil $B^5$ decreases. That coil acts upon the iron core $N^{15}$ and in consequence acts with greater force the greater the increase in the boiler pressure.

The cores $N^5$ and $N^{15}$ being united and their motion regulated by the springs $R^5$ and $R^{15}$, the combined cores are attracted to the left of their normal position when the boiler pressure decreases below normal, and are on the contrary, attracted to the right when the boiler pressure increases above normal. When the pressure decreases below normal, the more it decreases, the more will the cores move toward the left. Inversely, when the pressure rises above the normal pressure, as that pressure goes on rising, the more said combined cores $N^5$ and $N^{15}$ shift toward the right.

In consequence, the described part of the apparatus of Figure 5 operates in just the same way as the similar part of the apparatus of Figure 7 which has previously been described. The two cores $N^5$ and $N^{15}$ draw an appendage $D^5$ situated at the center of both cores. That appendage carries two cross members. The lower member is formed by two rods situated on the same horizontal plane at 180 degrees one to the other, that is, a right hand rod $C^{15}$ and a left hand rod $C^5$. Both rods pass with some friction respectively through the pieces $F^5$ and $F^{15}$ made of insulating material and carrying three washers $d$ of good electrical conducting metal.

In order to facilitate the description of the apparatus, we shall, for one moment, imagine the appendage as reduced to what has been described, that is, that neither the upper cross members $G^5$, $G^{15}$ nor the coils $E^5$ and $E^{15}$ exist. Then as regards the rod $C^{15}$ the apparatus is completed by the lower terminals $a^{45}$, $b^{45}$ and $c^{45}$ and the upper ones $a^{25}$, $b^{25}$ and $c^{25}$, the latter being at the same level as the terminals $a_{15}$, $b_{15}$ and $c_{15}$ appear to be situated in the figure. Each of these terminals is insulated from all the others. The function of the washers on the pieces $F^5$ and $F^{15}$ is to place in contact at the desired moment and at the same time the terminal $a_5$ with the terminal $a_{15}$, the terminal $b_5$ with the terminal $b_{15}$ and the terminal $c_5$ with the terminal $c_{15}$ when the appendage moves toward the left, or to place in contact the terminal $a^{45}$ with the terminal $a^{25}$, the terminal $b^{45}$ with the terminal $b^{25}$ and the terminal $c^{45}$ with the terminal $c^{25}$ when the appendage $D^5$ moves toward the right.

When the first occurs, that is, the rods $C^5$ and $C^{15}$ move toward the left, the rod $C^5$ draws the washers on the piece $F^5$ against the corresponding terminals and thus places the terminal $a_5$ in contact with the terminal $a_{15}$, the terminal $b_5$ with the terminal $b_{15}$ and the terminal $c_5$ with the terminal $c_{15}$. The normal current of the motor, assumed to be single-phase alternating, passes directly to the motor from line 1, coming out from the same through line $2_m$ the terminals $a_{15}$ and $a_5$ and the line 2; and the starting current enters the motor from line 1 through the terminals $b_5$ and $b_{15}$ and the line 3, coming out from the same by line 4 and the terminals $c_{15}$ and $c_5$ to line 2. We shall suppose that those currents cause the motor to revolve toward the left, so as to operate the valve governing the feed of the means of combustion in the direction to increase its aperture.

If, on the contrary, the rods move toward the right, the rod $C^{15}$ places the terminal $a^{45}$ in contact with the terminal $a^{25}$, the terminal $b^{45}$ with the terminal $b^{25}$ and the terminal $c^{45}$ with the terminal $c^{25}$. Then the normal current of the motor enters the same directly by line 1, and exits by line $2m$, terminals $a^{45}$ and $a^{25}$ to line 2. The starting current enters by the line 1, terminals $c^{45}$ and $c^{25}$ and line 4, and exits by line 3 the terminals $b^{25}$ and $b^{45}$, line $2m$ and terminals $a^{45}$ and $a^{25}$ to line 2. Then the motor rotates to the right, acting upon the valve governing the means of combustion so as to slowly and progressively diminish its aperture.

These features having been established, let us see how the apparatus in the form pointed out would operate.

If we suppose, for example, that with the feed of the means of combustion perfectly regulated a decrease of pressure be produced through an increase in steam consumption, the coil $B^5$ will come into action, attracting the core $N^5$ and producing the motion toward the left of the appendage $D^5$ which draws the rod $C^5$. That rod in turn will draw the piece $F^6$ until it contacts terminal $a_5$ with terminal $a_{15}$, terminal $b_5$ with terminal $b_{15}$ and terminal $c_5$ with terminal $c_{15}$. The motor $R^5$ will then come into action so as to slowly and progressively increase the feed of the means of combustion of the boiler.

As long as the drop of pressure is manifest the rod will continue to move toward the left and keep the designated contacts respectively between the terminals $a_5$, $b_5$ and $c_5$ and $a_{15}$, $b_{15}$ and $c_{15}$; that is, the motion of the motor will continue and the valve governing the feed of the means of combustion will open more and more. As soon as the pressure ceases to drop and tends to rise, the force of attraction of the coil $B^5$ will decrease, the core $N^5$ being less attracted will move slightly to the right under the action of the spring $R^5$; the appendage $D^5$ will reverse its motion and will separate the washers $d$ from the terminals $a_5$, $b_5$, $c_5$, $a_{45}$, $b_{45}$ and $c_{45}$.

The contact between those terminals will then cease to exist and the motion of the motor will be suspended, the aperture of the valve governing the means of combustion being in consequence fixed at an amount very near to that of its proper position in accordance with the existing steam consumption.

If the pressure goes on increasing, the appendage $D^5$ will continue its motion toward the right and will draw the piece $F^6$ only for a short time; because the screw $T^5$, the position of which can be regulated, will limit such action and will in consequence maintain the washers of that piece slightly spaced from the corresponding terminals. The rod $C^{15}$ will operate with the piece $F^{15}$ in the way described for the rod $C^5$ in accordance with its action on the piece $F^6$, opening and closing the electric contacts that govern the motion of the motor $R^5$ toward the left.

The installation in that form would have a defect. If we suppose that under the effect of an excess of pressure the appendage $D^5$ has been drawn substantially toward the right and is returning from the right end of its path to its normal position, then during that return motion the rod $C^5$ would draw the piece $F^5$ and would place the terminals $a_5$, $b_5$ and $c_5$ in contact with the terminals $a_{15}$, $b_{15}$ and $c_{15}$ with the boiler pressure still standing too high, producing rotation of the motor in the direction to increase the means of combustion in spite of the excess which those means of combustion would already be exhibiting.

In order to prevent that danger it is necessary that the terminals $a_5$, $b_5$ and $c_5$ do not come in contact with the terminals $a_{15}$, $b_{15}$ and $c_{15}$ except when the boiler pressure is lower than normal; and in the same way, that the terminals $a^{45}$, $b^{45}$ and $c^{45}$ do not come in contact with the terminals $a^{25}$, $b^{25}$ and $c^{25}$ except when the boiler pressure is above the normal pressure. These conditions are obtained by means of the arrangement shown in the drawing, which I now proceed to explain.

The terminals $a_{45}$, $b_{45}$ and $c_{45}$ are fixed upon a plate $P^5$ capable of moving vertically under the action of a coil $E^5$, and in the same way the terminals $a^{25}$, $b^{25}$ and $c^{25}$ are fixed upon another plate $P^{15}$ capable of moving vertically under the action of a second coil $E^{15}$. When the current passes through the coil $E^5$ the plate $P^5$ is attracted and the terminals $a_{45}$, $b_{45}$ and $c_{45}$ are raised in such a way that they cannot make contact with the washers $d^5$. The coil $E^{15}$ can raise the terminals $a^{25}$, $b^{25}$ and $c^{25}$ and their plate $P^{15}$ in the same way, and the figure shows these terminals and plate in that raised position.

The upper cross member of the appendage $D^5$ has two symmetrical curves $G^5$ and $G^{15}$. When with the plate $P^{15}$ raised, as in the figure, the appendage $D^5$ moves toward the right, the curve $G^{15}$ serves as a guide to the roller $O^{15}$ on plate $P^{15}$, causing the descent of the plate $P^{15}$ until, $O^{15}$ having passed under the right arm of the upper cross member of the appendage $D^5$, the plate $P^{15}$ and the terminals $a^{25}$, $b^{25}$ and $c^{25}$ occupy their lower position. In the same way the curve $G^5$ operates with the roller $O^5$, the plate $P^5$ carrying said roller, and terminals $a_{15}$, $b_{15}$ and $c_{15}$.

Let us suppose that with the terminals $a^{25}$, $b^{25}$ and $c^{25}$ in their upper positions, as the figure shows, owing to the passing of the current through the coil $E^{15}$, the pressure rises in the manometer and the appendage $D^5$ moves toward the right under the action of the coil $B^{15}$. The curve $G^{15}$, advancing, will act upon the roller $O^{15}$ and will cause the descent of the plate $P^{15}$ so as to place the terminals $a^{25}$, $b^{25}$ and $c^{25}$ in their operating position. In the same way the curve $G^5$ will operate with the roller $O^5$, at the start of a fall of pressure, so as to place the terminals $a^{25}$, $b^{25}$ and $c^{25}$ in their operating position in spite of the fact that the current is passing in the coil $E^5$. In consequence, by means of the described arrangement the coils $E^5$ and $E^{15}$ can operate constantly upon the plates $P^5$, $P^{15}$ without harm to the operation, because the appendage $D^5$ will compel said plates to take their operating positions at the time when their act is necessary.

The figure must be taken only as schematic, because not all the mechanism that facilitate the motions pointed out have been shown in the same, such as constructing the upper terminals or the washers with a bevel at their planes of contact, and also not only upon one roller for lowering the plates $P^5$ and $P^{15}$, but upon several rollers, so that that motion will be effected without friction, $P^5$ and $P^{15}$ maintaining their horizontal positions during that motion. These details have not been shown in order to avoid complications in the figure.

At the beginning of the description I have pointed out that the regulation shown by the figure under consideration permits, when the pressure had passed through a minimum the corrections automatically of the excess of aperture which the valve governing the feed being regulated might have at that moment; to which end the motor would operate during a short time in reverse direction to its previous motion; and inversely, when the pressure had passed through a maximum, the excess of the closing of the governing valve might be corrected automatically, to which end the motor would operate during a short time in reverse direction to that of its previous motion.

The means for obtaining these desiderate consist in the employment of the arrangements described, by means of which the upper terminals can be raised and placed out of contact with the washers $d^5$ as long as the pressure conditions existing in the boiler do not require their action. I have noted that if, for example, the appendage $D^5$, having moved toward the right owing to an excess of pressure, should return toward its normal position, appendage $D^5$ would draw the piece $F^6$ in that motion until the washers $d^5$ of that piece struck the terminals $a_5$, $b_5$ and $c_5$; and if at that moment the terminals $a_{15}$, $b_{15}$ and $c_{15}$ should be at their operating position, namely in their lower position, they would also come in contact with the washers, the currents that are established by the closing of the contact through the washers $d^5$ of the terminals $a_5$ and $a_{15}$, $b_5$ and $b_{15}$ and $c_5$ and $c_{15}$ respectively, would be produced; that is, the motor would again revolve in reverse direction to its previous motion.

In consequence, if we wish rotation opposite to the preceding rotation to take place in the motor for a short time, it is sufficient to maintain the terminals $a_{15}$, $b_{15}$ and $c_{15}$ in their operating position during that short time, and, once that time has passed, to lift the plate $P^5$ by means of the coil $E^5$. That is, we have to leave the coil E without current from the moment in which the appendage $D^5$ shall have arrived at the end of its course toward the right, during the short time that may be required for the motor to make the aperture correction in the governing valve, and that time having passed, to reestablish the current in the coil. The arrangement which produces these results automatically is the following one.

The motor $R^5$ drives screw $K^5$ by means of the cogs $P^{25}$ and $Q^5$. The motion of screw $K^5$ produces in turn the lateral motion from right to left, and vice versa, of the piece $J^5$ threaded thereon. The piece J has a central part $O^{25}$ at its upper part forming a guide which slides on the interior of the upper part of the frame $S^5$. Said part $O^{25}$ carries on its right and left two plates or metallic terminals electrically insulated from said piece and in electric connection with the line $l$. For this purpose $I^5$ and $I^{15}$ are provided independent from the piece $J^5$ but shifted by its motion. Each of said pieces carries on the face fronting the part $O^5$ of the piece $J^5$, a metallic plate or terminal electrically insulated from the piece carrying it, that is, the terminal $e^5$ carried by the piece $I^5$ and the terminal $e^{15}$ carried by the piece $I^{15}$. The lower parts of the pieces $I^5$ and $I^{15}$ slide during the lateral motion of said pieces on the interior of the lower part of the frame $S^5$, forming a guide for said pieces.

The terminal $e^5$ of the piece $I^5$ is electrically connected with the winding of coil $E^5$ by the line $e^{25}$ and the other end of that coil is permanently connected to the main line 2, though such connection has not been shown in order to simplify the figure. In the same way the terminal $e^{15}$ carried by the piece $I^{15}$ is electrically connected with the beginning of the coil $E'$ by the line $e^{35}$, and the end of the coil $E^{15}$ is also permanently connected with line 2, even though such connection has not been shown in the figure.

Let us see now how this part of the apparatus operates. When the motor rotates screw $K^5$ toward the left in piece $J^5$ the piece $I^{15}$ is shifted by the part $O^{25}$ of piece $J^5$ toward the right, and the contact between the two plates carried by these two pieces and situated between them is established. Thus, the coil $E^{15}$ is energized and has a tendency to raise the plate $P^{15}$; but since the boiler pressure stands then above its normal level the appendage $D^5$ is moved toward the right, and through the roller $O^{15}$ maintains plate $P^{15}$ and the terminals $a^{25}$, $b^{25}$ and $c^{25}$ in their lower position, permitting the current to pass through the motor, impelling it to revolve to the right.

In that motion the motor keeps gradually closing the valve regulating the means of combustion. A few moments after that valve reaches its proper aperture for the existing steam consumption, the boiler pressure passes through a maximum and tends to fall. The coil $B^{15}$ acts upon $N^{15}$ with less force of attraction and the combination of the two cores $N^5$ and $N^{15}$ and the appendage $D^5$ start their return toward the left. By reason of that motion the washers $d^{15}$ are separated from the terminals $a^{25}$, $b^{25}$, $c^{25}$, $a^{45}$, $b^{45}$ and $c^{45}$ and the electrical contacts between $a^{45}$ and $a^{25}$, $b^{45}$ and $b^{25}$ and $c^{45}$ and $c^{25}$ that insured the passing of the operating currents of the motor become open, causing the stopping of the motor. At that moment the pieces $J^5$ and $I^{15}$ are at the right hand end of their motion, the piece $I^{15}$ being shifted by the part $O^{25}$ of the piece $J^5$ through the contact between the corresponding terminals.

The coil $E^{15}$ continues therefore to be provided with current. On the contrary, since the piece $I^5$ removed by the screw $L^5$ remains slightly separated from the piece $O^{25}$, the terminal $e^5$ is separated from the corresponding terminal situated upon the part $O^{25}$ of the piece $J^5$, and the current in the coil $E^5$ is broken. The plate $P^5$ is therefore at its lower position, and the terminals $a_{15}$, $b_{15}$ and $c_{15}$ are in operating condition.

The appendage $D^5$ continuing its motion toward the left, the rod $C^5$ will in a very short time place the washers $d^5$ of the piece $F^5$ in contact with the terminals $a_5$ and $a_{15}$, $b_5$ and $b_{15}$ and $c_5$ and $c_{15}$, reestablishing the operating currents of the motor to the left. The motor then resumes its motion in a contrary direction to its previous motion. As soon as that motion is started, the piece $J^5$ begins to return toward the left, departing from the piece $I^{15}$ and approaching the piece $I^5$. The terminal $e^{15}$ loses contact with the corresponding terminal carried by the part $O^5$ of the piece $J^5$ and the current in the coil $E^{15}$ is suspended. When by its motion toward the left piece $J^5$ comes in contact with the piece $I^5$, the terminal $e^5$ makes contact with the corresponding terminal situated on the part $O^{25}$ of the piece $J^5$, the current of the line 1 enters the coil $E^5$ through the lines $f^5$ and $e^5$, and that bobbing getting into action lifts the plate $P^5$ and in consequence suspends the currents operating the motor $R^5$ thus causing the stopping of that motor.

There has thus been obtained a motion of the motor in reverse direction, while the part $O^{25}$ of the piece $J^5$ passes from its contact with the piece $I^{15}$ to contact with the piece $I^5$. The lapse of time can be regulated by means of the set screws $L^5$ and $L^{15}$ so that the reverse movement of the motor exactly corresponds to compensating for the excess of closure that the governing valve showed when the maximum pressure was indicated in the manometer.

The apparatus operates in a similar way when a minimum of pressure is indicated, and therefore it is unnecessary to described that operation.

Figure 6 represents the details of one of the plates $P^5$ in side elevation.

From comparison of the systems of Figures 5 and 7, it appears that in the first of these figures not only has the regulating process been supplemented by an arrangement which, after a maximum in pressure or water level in the boiler has been recorded, a slight motion of the motor inverse to its previous motion is produced to correct the imperfect aperture of the valve governing the feed regulated by the apparatus; but in Figure 5 the employment of the current which in Figure 7 operated the coils $E^7$ and $E^{17}$ is avoided, because the opening or closing of the three contacts that renew, or suspend, the current in the motor which acts upon the aperture of the valve is effected directly in Figure 5; and, on the contrary, is effected indirectly by a complementary current in Figure 7.

This simplification in the construction of Figure 5 has its disadvantages, because since the opening and closing of the three contacts are effected by one single mechanical motion, that arrangement requires much greater perfection in construction.

Some elasticity might be given to the terminals to prevent the contact of some one of the terminals from closing; but evidently the arrangement of Figure 7, even though it requires a supplementary current, offers greater certainty of good functioning.

This arrangement can of course be applied to Figure 5. It is sufficient to reduce each group of terminals $a_5$, $b_5$, $c_5$; $a^{25}$, $b^{25}$, $c^{25}$; $a_{15}$, $b_{15}$, $c_{15}$; $a^{45}$, $b^{45}$, $c^{45}$ to one single terminal and to apply the supplementary current in the way shown in Figure 7 to govern the motor with that single terminal, to obtain in Figure 5 the advantages of employing one single terminal.

The arrangement of Figure 5 for obtaining automatically a slight reverse motion of the motor, after the pressure of the indicated level has passed through a maximum or a minimum, is also evidently applicable to Figure 7. In that application it will be advantageous for the coils operating like the coils $E^5$ and $E^{15}$ of Figure 5, instead of modifying the location of the upper terminals, shall open or close switches in the circuits of the complementary currents that operate the coils which perform the functions of coils $E^5$ and $E^{15}$ of Figure 5, so as to produce the interruption of such currents, instead of interrupting them by displacement of the upper terminals.

Figure 8:
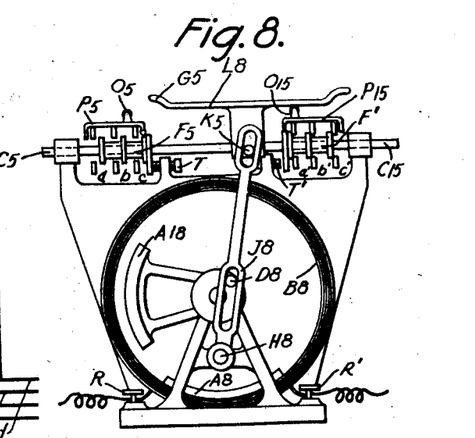
Fig. 8 is an elevation of another type of construction for suppressing oscillations in the regulating systems.

Figure 8 represents an arrangement with a similar operation to that of Figure 7, and does not have the arrangement which permits motion of the motor in reverse direction to its previous motion, after the pressure or the level through the variations of which the regulation is established has passed one of its extremes. In Figure 8 the current of the circuit $a^7b^7$ of Figure 7 which passes through the coil $B^8$ magnetizes the pieces $A^8$ and $A^{18}$, producing a repulsion between these two pieces that is ever greater as the current passing through $B^8$ is greater. Since that repulsion is counterbalanced by the weight of the piece $A^{18}$, there corresponds to a given current a position of that piece.

Let us suppose, for example, that said apparatus is applied to regulate the water feed by the level variation in the boiler. When that level stands at its normal position, and the current passing through the tube $a^3b^3$ of Figure 7 has its mean value, the bar $J^8$ will be vertical and the piece $L^8$ at its mean position. Then plate $P^5$ (see Fig. 8) as well as plate $P^{15}$ are lifted by springs (not shown), and this prevents all the terminals from coming into contact.

When the boiler level falls and, in consequence, the current passing through the tube $a^3b^3$ of Figure 5 decreases, the piece $A^{18}$ approaches the piece $A^8$, the appendage $K^5$ moves toward the left and the piece $L^8$, acting through its curve $G^5$ upon the roller $O^5$, causes the plate $P^5$ to descend, allowing the washers of the piece $F^5$ to place the terminals of the plate $P^5$ in contact with the terminals $a_5$, $b_5$, and $c_5$, so that through such contacts the motor is started. But, at the same moment, the plate $P^{15}$ being lifted, the terminals of that piece cannot receive current through the washers of the piece $F^{15}$ and, in consequence, cannot intervene in the motion of the motor.

When, on the contrary, the boiler level rises above normal and, in consequence, the current of the electric circuit $a^7$ $b^7$ increases above the mean current, the piece $A^8$ and the piece $A^{18}$ repelling each other with greater force, $A^8$ gets farther from $A^{18}$, the bar $J^8$ inclines toward the right and acts through the roller $O^{15}$ upon the plate $P^{15}$ to maintain the terminals of that plate in a position permitting them to receive, and to transmit to the motor the currents that cause the motion of that motor. In consequence, by virtue of that arrangement, as long as the level is lower than normal only the terminals of the rod $C^5$ may act, and on the contrary, when the level is higher than normal only the terminals of the rod $C^{15}$ may act.

This figure has been arranged for three terminals in each group, as in Figure 5; but it might also have been limited to one single terminal as in Figure 7, as has been previously explained.

I claim:

1. An automatic regulating system for steam boiler systems comprising a coil formed of vertical tubes and arranged with one end of the coil connected to the steam zone in the boiler, non-miscible liquids of different densities filling said tubes, the upper ends of two adjacent tubes being connected by a horizontal tube of reduced diameter, one of the liquids being a column of mercury located in the horizontal tube, the arrangement being such that the mercury column is shifted by movements of the liquids in the coil in accordance with variations in an operating characteristic of the boiler, and said liquids are maintained in equilibrium by variations in the proportion of light and heavy liquid in each tube when said liquids are shifted, counterbalancing the changes in pressure due to variations in said operating characteristic causing such shift, the liquids contacting the ends of the mercury column being poor conductors of electricity, means for adjusting a fluid feed to the boiler system, and electrical control means for the adjusting means connected to said mercury column and actuated by movement thereof, arranged to vary said feed in accordance with variations in the position of said mercury column corresponding to variations in said operating characteristic.

2. Apparatus as set forth in claim 1 in which the fluid feed comprises the supply of water to the boiler.

3. Apparatus as set forth in claim 1 in which the fluid feed comprises the feed of an element of combustion to the boiler system.

4. Apparatus as set forth in claim 1 in which the electrical control means includes two spaced electrodes in the path of the mercury column arranged to be bridged by said column when shifted from normal position, and a control circuit connected across said electrodes.

5. Apparatus as set forth in claim 1 in which the electrical control means includes a conductor of higher resistance than said mercury arranged in series therewith, along which the mercury travels to vary the effective resistance of the conductor, and a control circuit including said mercury column and conductor in series.

6. A regulating system for correcting variations in a given characteristic from a constant, including an apertured device controlling the value of the characteristic, control means for changing said aperture automatically when said characteristic varies from its constant in a direction appropriate to correct said variation, including an electromagnet, an armature shifted by said electromagnet when energized and a control member shifted by the armature during corrective movement of the latter, electrically operated means for varying said aperture and an electrical control system for the latter means, including an actuating circuit passing through the contact between the armature and said control member, the arrangement being such that when the movement of the armature is arrested and reversed by completion of the correction, the armature and control member will separate, breaking the contact and deenergizing the actuating means.

7. A regulating system for correcting variations in a given characteristic from a constant, comprising a regulating device for varying said characteristic, means including a motor for operating the regulating device and an electrical control system for the motor, including an electromagnet, electrical means for varying the current through the electromagnet in accordance with variations in said characteristic, an armature associated with the electromagnet and shifted in accordance with variations in said current, and a movable contact element shifted by engagement with the armature during movement thereof away from mean position corresponding to the constant of said characteristic, the motor circuit passing through the contact between the armature and the movable member, the arrangement being such that the armature is shifted away from the movable member, opening the motor circuit and arresting the corrective movement of the valve, when the armature reverses its direction of movement toward its mean position.

8. A system as set forth in claim 7, including a spring member located at the contact between said armature and movable member and compressed by the corrective movement of the armature, arranged to maintain said contact during a limited decompression of the spring during a limited period at the beginning of the return movement of the armature.

9. In a steam boiler regulating system apparatus controlled in accordance with variations in a condition in the boiler to vary a feed to the boiler system comprising an electric circuit in which a resistance is interposed varying at the same time as the operating characteristic and an amperemeter; a second circuit comprising the amperemeter needle and a resistance the amount of which interposed in the circuit varies with the position of the needle on its scale, that second circuit comprising an electromagnet which draws along an appendage, a third electric circuit including a motor controlling the feed to said boiler, the normal position of said appendage corresponding with the normal value of the regulating characteristic, said appendage on deviating from that normal position to predetermined extreme positions under the action of a current variation in the electromagnet closing said third electric circuit to cause actuation of said motor and thereby modify said feed in a compensating direction in accordance with the direction of deviation of the regulating characteristic at that moment.

10. A steam boiler regulating apparatus as set forth in claim 9 in which the third electric circuit includes two component circuits, one closed when the regulating characteristic is greater than its normal value and the other closed when said regulating characteristic is less than the normal amount, and in which the appendage is provided with two rods, the first one shifted when the regulating characteristic is greater than its normal value and the second one when the regulating characteristic is less than its normal value.

11. A steam boiler system regulating apparatus comprising a device for varying a feed to the boiler system, mechanism including a motor for operating the device to vary said feed means and a motor control system including an electromagnet, means for varying the current through the electromagnet in accordance with deviations in said characteristic from normal, an armature associated with the electromagnet and shifted in accordance with variations in said current, a movable rod engaged and shifted by the armature during movement from normal position, a motor energizing circuit including a fixed terminal, and a terminal movably mounted on the rod arranged to contact the fixed terminal when the rod is shifted from normal position and movable on the rod while maintaining said contact during continued movement of the rod in the same direction, the arrangement being such that when the deviation is compensated and the armature and rod commence movement in the reverse direction toward normal position, the contacts will be separated and the motor circuit broken.

12. Regulating apparatus as set forth in claim 11, including means for shifting the movable contact in the reverse direction on the rod during reverse movement of the rod toward normal position while maintaining said movable contact spaced from the fixed contact.

13. A steam boiler regulating apparatus as set forth in claim 9 including a fixed contact element, a movable rod engaged and shifted by the appendage during movement from normal position, a cooperating contact element slidably mounted on the rod, said contact elements being connected in said electrical circuit system, and a stop arranged to arrest the slidable contact element in suitably spaced relation to the fixed contact element during return movement of the appendage.

14. A steam boiler regulating apparatus as set forth in claim 9 in which the third electrical circuit includes two component circuits, one closed when the regulating characteristic is greater than its normal value and the other closed when said regulating characteristic is less than the normal value, and in which the appendage is provided with two rods and means is provided for shifting the first rod when said characteristic is greater, and shifting the said second rod when said characteristic is less, than its normal value, said shifting means including a lost motion connection whereby an interval is provided between the end of the operative movement of one rod and the commencement of the return movement of the other rod.

15. A steam boiler system regulating apparatus including means for adjusting a feed to the boiler system and electrical means for automatically operating the adjusting means to correct variations from normal in a characteristic of the boiler system, including an electric motor, and an electrical circuit system for controlling the operation of the motor including two contact rods, cooperating fixed contacts, means operable upon deviation of said characteristic in one direction for moving one rod to close its corresponding contact and energize the motor for operation in one direction, means operable upon deviation of said characteristic in the other direction for shifting the other rod and closing appropriate contacts to actuate the motor in the opposite direction, control switches in the circuits of the contacts carried by said rods, and electrical means for closing said switches selectively to energize the proper contacts.

16. A process for regulating a steam boiler in accordance with the variations in one of the operating characteristics of said boiler, to maintain said characteristic at a predetermined normal value, which comprises effecting continuous regulation of said characteristic in a direction tending to restore said characteristic towards normal value as said characteristic departs from said normal value, effecting a slight counter-regulation in an opposite direction when said characteristic ceases to depart from said normal value and approaches said normal value to compensate for an excess correction effected in said characteristic by said regulation in its original direction, and thereafter maintaining said regulation continuously arrested while said characteristic is approaching said normal value.

17. An apparatus for automatically regulating a steam boiler in accordance with variations in one of the operating characteristics of said boiler, to maintain said characteristic at a predetermined normal value, comprising means for effecting continuous regulation of said characteristic in a direction tending to restore said characteristic towards normal value as said characteristic departs from said normal value, and means for effecting a slight counter-regulation in an opposite direction when said characteristic ceases to depart from said normal value and approaches said normal value to compensate for an excess correction effected in said characteristic by said regulation in its original direction, and for thereafter continuously maintaining said regulation arrested while said characteristic is approaching said normal value.

JEAN LOUMIET ET LAVIGNE.

REFERENCES CITED

The following references are of record in the file of this patent:

UNITED STATES PATENTS

| Number | Name | Date |
|---|---|---|
| 1,649,342 | Fenno | Nov. 15, 1927 |
| 2,203,472 | Schmidt | June 4, 1940 |
| 2,128,096 | Loepsinger | Aug. 23, 1938 |
| 771,447 | Tripp | Oct. 4, 1904 |
| 949,598 | Roberts | Feb. 15, 1910 |
| 1,569,097 | MacKenzie | Jan. 12, 1936 |
| 1,369,314 | Anderson et al. | Feb. 22, 1921 |
| 1,699,075 | McNeill | Jan. 15, 1929 |
| 1,891,810 | Gianolio | Dec. 20, 1932 |
| 1,832,150 | Stender | Nov. 17, 1931 |
| 1,448,401 | Harvey | Mar. 13, 1923 |
| 2,170,346 | Dickey | Aug. 22, 1939 |
| 2,119,061 | Stein | May 31, 1938 |
| 1,782,926 | Kimball | Nov. 25, 1930 |
| 2,216,724 | Eddy | Oct. 8, 1940 |

FOREIGN PATENTS

| Number | Country | Date |
|---|---|---|
| 756,835 | France | Oct. 2, 1933 |
| 279,773 | Great Britain | July 31, 1928 |
| 397,233 | Germany | June 30, 1924 |
| 723,974 | France | Jan. 23, 1932 |